(12) United States Patent
Balsdon et al.

(10) Patent No.: US 9,631,583 B2
(45) Date of Patent: Apr. 25, 2017

(54) LATCHING MECHANISM FOR A FUEL TANK ISOLATION VALVE ASSEMBLY

(71) Applicant: Continental Automotive Systems, Inc., Auburn Hills, MI (US)

(72) Inventors: David William Balsdon, Chatham (CA); Brian Gordon Woods, Chatham (CA)

(73) Assignee: Continental Automotive Systems, Inc., Auburn Hills, MI (US)

( * ) Notice: Subject to any disclaimer, the term of this patent is extended or adjusted under 35 U.S.C. 154(b) by 403 days.

(21) Appl. No.: 14/487,448

(22) Filed: Sep. 16, 2014

(65) Prior Publication Data

US 2015/0102039 A1 Apr. 16, 2015

Related U.S. Application Data

(60) Provisional application No. 61/891,018, filed on Oct. 15, 2013.

(51) Int. Cl.
*F02M 25/08* (2006.01)
*F16K 31/524* (2006.01)
*F16K 31/06* (2006.01)

(52) U.S. Cl.
CPC ...... *F02M 25/0836* (2013.01); *F02M 25/089* (2013.01); *F16K 31/0655* (2013.01); *F16K 31/52408* (2013.01); *F02M 2025/0845* (2013.01)

(58) Field of Classification Search
CPC ............... F02M 25/0836; F02M 25/08; F02M 2025/0845; F02M 25/089; F16K 31/52408; F16K 31/0655
See application file for complete search history.

(56) References Cited

U.S. PATENT DOCUMENTS

| | | |
|---|---|---|
| 3,220,695 A | 11/1965 | Downey et al. |
| 3,780,980 A | 12/1973 | Kallel |
| 2003/0042452 A1* | 3/2003 | Burke ................ F02M 25/0836 251/129.15 |
| 2014/0042347 A1 | 2/2014 | Williams et al. |

FOREIGN PATENT DOCUMENTS

CN 101847539 A 9/2010

* cited by examiner

*Primary Examiner* — Jacob Amick (57) ABSTRACT

A vapor purge system having a tank isolation valve and a canister vent valve, where each valve includes a latching mechanism for maintaining the valves in an open position. A diagnostic test is performed on the purge system to prove that each of the valves are functioning correctly. Using latching valves in these applications reduces electricity draw from the battery and reduces electrical interference with integrated pressure sensors. The fuel tank is sealed by the tank isolation valve between the fuel tank and a vapor storage canister, and the canister vent valve provides sealing between the canister and the atmosphere, and controls venting of the canister. The tank isolation valve reduces power consumption from the battery, while the valve is being held in either an open position or a closed position by the latching mechanism, and uses only a single pulse of voltage to change the state of the valve.

21 Claims, 9 Drawing Sheets

LATCHING MECHANISM FOR A FUEL TANK ISOLATION VALVE ASSEMBLY

CROSS-REFERENCE TO RELATED APPLICATIONS

This application claims the benefit of U.S. Provisional Application No. 61/891,018 filed Oct. 15, 2013. The disclosure of the above application is incorporated herein by reference.

FIELD OF THE INVENTION

The invention relates generally to a vapor purge system having a fuel tank isolation valve assembly integrated with a pressure sensor, as well as a canister vent valve, where the fuel tank isolation valve assembly includes a latching mechanism which maintains the fuel tank isolation valve assembly in an open position or closed position when no current is used.

BACKGROUND OF THE INVENTION

Current fuel systems for vehicles include a valve which opens and closes to allow vapor from the fuel tank to escape when the tank is being re-fueled. The vapor flows from the fuel tank, through the valve, and into a canister, where the vapor is stored until it is dispensed back into the intake of the engine. The valve is also able to provide relief of vacuum pressure that builds up in the fuel tank as the fuel levels decrease during operation of the vehicle, and also functions to seal the fuel tank between the fuel tank and the vapor storage canister.

The valve is typically operated using an actuation device, such as a solenoid, which is energized to open the valve, and hold the valve in an open position while the vehicle is being refueled. Current designs for solenoids used in these applications remain energized while the valve is opened during the time the vehicle is being re-fueled. This drains power from the battery, and reduces the overall efficiency of the vehicle. Additionally, the fuel tank, and the portion of the airflow system outside the fuel tank must be tested for leaks, so the airflow system must also be sealed with a valve on the fresh air side of the canister, such as a vent valve. These valves must also be tested to make sure they are functioning properly and that their positions (e.g. open or closed) may be verified, with minimal costs. This type of diagnostic testing may be required when the valves are first installed on a vehicle (during the manufacturing process or after repair), or after the battery has been disconnected.

Accordingly, there exists a need for a valve assembly which is able to remain in an open position while the vehicle is being re-fueled to allow vapors to flow out of the fuel tank, while at the same time minimizing the amount of energy used to maintain the valve in an open position. There is also a need for a valve assembly which meets current packaging requirements, and is capable of performing diagnostic tests to ensure that the valves are working correctly after installation, or after the battery has been disconnected.

SUMMARY OF THE INVENTION

The present invention is a type of airflow system, or more specifically, a vapor purge system, having a tank isolation valve and a canister vent valve, where each valve includes a latching mechanism for maintaining the valves in an open position. A diagnostic test is performed on the vapor purge system to prove that each of the valves are functioning correctly. Using latching valves in these applications reduces the electricity draw from the battery and reduces electrical interference with integrated pressure sensors. The fuel tank is sealed by the tank isolation valve between the fuel tank and a vapor storage canister, and the canister vent valve provides sealing between the canister and the atmosphere, and controls venting of the canister. The diagnostic test is performed using the tank isolation valve and the canister vent valve under different operating conditions.

The tank isolation valve reduces power consumption from the battery, while the valve is being held in either an open position, or a closed position, and uses only a short, single pulse of voltage, to change the state of the valve. The most common time that the valve is held open is during refueling. During refueling, the engine is typically shut off. The valve is held open without battery power because of the latching mechanism. A solenoid used with the latching mechanism avoids having to use continuous battery power.

This invention describes the on-board diagnostic check used to ensure that the valves are functioning correctly. The invention also provides a method for proving both functionality and the current state of the valves (e.g., open or closed) using only the pressure sensors that are part of the vapor purge system.

In one embodiment, the present invention is a latching mechanism for a fuel tank isolation valve. The latching mechanism includes a bobbin, a coil substantially surrounding the bobbin, and an inner stator insert partially surrounded by the bobbin. An armature is at least partially surrounded by the inner stator insert, and has a large diameter portion and a small diameter portion. An indexing latch is connected to a portion of the small diameter portion of the armature, such that the indexing latch moves with the armature. An index mechanism substantially surrounds a portion of the small diameter portion of the armature, and is selectively engaged with the indexing latch.

A spring cup also substantially surrounds part of the small diameter portion of the armature, and the spring cup is adjacent the index mechanism. A load spring is disposed between the inner stator insert and the spring cup, such that the load spring is in contact with the spring cup and biases the spring cup away from the inner stator insert. A return spring also substantially surrounds part of the small diameter portion of the armature, such that the return spring is disposed between the large diameter portion of the armature and the spring cup. The return spring biases the spring cup away from the large diameter portion of the armature.

There is also a reservoir cavity, and the valve, the valve seat, the indexing latch, the index mechanism, and the spring cup are all disposed in the reservoir cavity. An overmold assembly cavity is in fluid communication with the reservoir cavity, and the coil and the bobbin are adjacent the overmold assembly cavity. A guide is also located in the reservoir cavity. The guide is in contact with and adjacent the bobbin, and the index mechanism is selectively engaged with the guide.

The small diameter portion of the armature is connected to a valve. The valve is in contact with a valve seat when the valve is in a closed position, and the valve is moved away from the valve seat then the valve is in an open position. The coil is energized to move the armature and the valve away from the valve seat against the force of the load spring and the return spring when the indexing latch is engaged with the index mechanism, and the valve is in contact with the valve seat and in the closed position. When the armature, the valve, and the indexing latch are moved far enough away from the valve seat, the index mechanism rotates about the armature and becomes engaged with the guide, maintaining the valve in the open position when the coil is then de-energized.

When the valve is in the open position, the coil is again energized to move the armature, the valve, and index mechanism away from the guide, such that the index mechanism disengages from the guide, rotates about the armature, and reengages with the indexing latch. When the coil is then again de-energized, the valve moves to the closed position.

In one embodiment, the fuel tank isolation valve is in fluid communication with a fuel tank and a canister, and the valve is changed between the open position and the closed position to control vacuum pressure in the fuel tank, and the flow of purge vapor from the fuel tank to the canister.

In one embodiment, the spring cup includes an inner cylindrical portion located next to the index mechanism, a central flange integrally formed with the inner cylindrical portion, and an outer cylindrical portion integrally formed with the central flange such that the outer cylindrical portion is circumscribed by part of the load spring. An outer flange is integrally formed with the outer cylindrical portion, and the load spring is in contact with the outer flange. The load spring is disposed between the outer flange and the inner stator insert, and biases the spring cup and the index mechanism away from the inner stator insert, such that the valve is biased towards a closed position when the index mechanism is engaged with the indexing latch.

A first plurality of teeth is formed as part of the indexing latch, a second plurality of teeth and a plurality of slots are formed as part of the guide, and a plurality of indexing teeth is formed as part of the index mechanism. Each of the plurality of indexing teeth are disposed in a corresponding one of the plurality of slots and engaged with the first plurality of teeth when the valve is in the closed position. The plurality of indexing teeth are removed from the plurality of slots and engaged with the second plurality of teeth when the valve is in the open position.

Additionally, the first plurality of teeth are positioned relative to the second plurality of teeth such that when the valve is in the closed position and the coil is energized, the indexing latch and the index mechanism are moved away from the valve seat such that the first plurality of teeth move the plurality of indexing teeth out of the plurality of slots, causing the index mechanism to rotate relative to the armature, and engage the second plurality of teeth when the coil is de-energized, allowing the first plurality of teeth to disengage from the plurality of indexing teeth.

When the plurality of indexing teeth are engaged with the second plurality of teeth and the valve is in the open position, the coil is again energized to reengage the first plurality of teeth with the indexing teeth such that the plurality of indexing teeth are disengaged from the second plurality of teeth, causing the index mechanism to rotate relative to the armature, allowing each of the plurality of indexing teeth to move back into a corresponding one of the plurality of slots, which then allows the armature and the valve to move toward and contact the valve seat when the coil is again de-energized, placing the valve back in the closed position.

There is also a plurality of indexing splines formed as part of the indexing latch, and each one of the plurality of indexing splines slides is located in one of the plurality of slots as the indexing latch moves relative to the guide.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
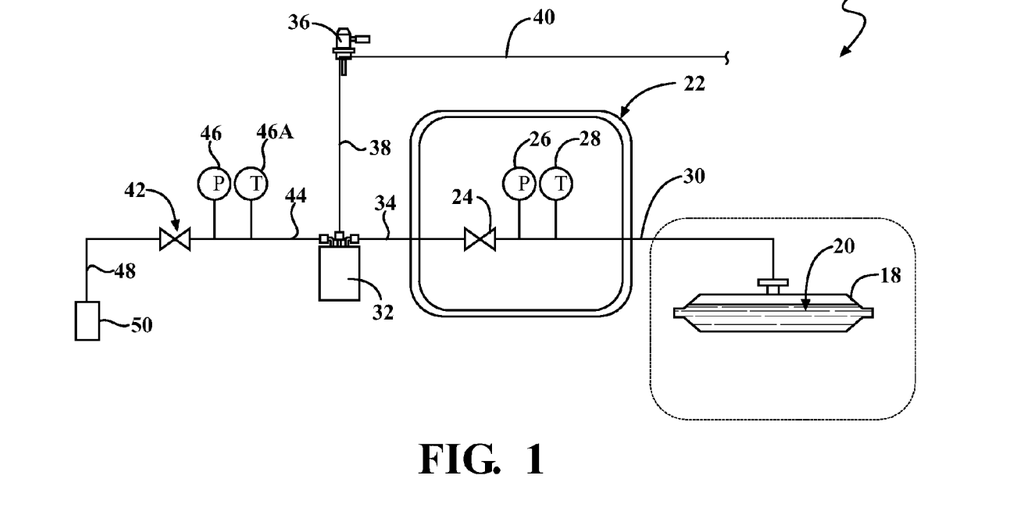
FIG. 1 is a diagram of a vapor purge system for a vehicle having at least one valve incorporating a latching mechanism, according to embodiments of the present invention.

A diagram of a vapor purge system according to the present invention is shown in FIG. 1 generally at 10. The system 10 includes a fuel tank 18, where fuel 20 is stored. The fuel tank 18 is in fluid communication with an isolation valve assembly, shown generally at 22 in FIGS. 1-2. The isolation valve assembly 22 includes a tank isolation valve 24, a pressure sensor 26, and a temperature sensor 28. The valve 24 is in fluid communication with the fuel tank 18 through the use of a first conduit 30. Both the pressure sensor 26 and temperature sensor 28 are integrated with the isolation valve assembly 22, and are in fluid communication with the first conduit 30 in between the valve 24 and the fuel tank 18.

The tank isolation valve 24 is in fluid communication with a vapor canister 32 through the use of a second conduit 34. The vapor canister 32 is also in fluid communication with a purge valve 36 because of a third conduit 38. The purge valve 36 is also connected to and in fluid communication with a fourth conduit 40, where the fourth conduit 40 is connected to another component of the system, such as a turbocharger unit (not shown).

The canister 32 is also in fluid communication with a canister vent valve 42 through the use of a fifth conduit 44. Also connected to and in fluid communication with the fifth conduit 44 is a pressure sensor 46 and a temperature sensor 46A. A sixth conduit 48 is also connected to, and in fluid communication with, the canister vent valve 42 and an air filter 50.

During operation, the tank isolation valve 24 is in a closed position such that the vapors in the fuel tank 18 cannot escape. When the tank 18 is being re-fueled, the tank isolation valve 24 is opened to allow vapors in the tank 18 to flow into the canister 32. The canister vent valve 42 is typically in an open position during normal operation, and closed during different steps of an on-board diagnostic test, the function of which will be described later. The purge vapor is typically stripped of hydrocarbons in the canister 32, and the air that flows out of the canister 32 passes through the canister vent valve 42.

The canister vent valve 42 and the isolation valve 24 are of substantially similar construction and have substantially the same components as shown in FIGS. 2, 4, 5A-5B, and 6A-6F, and therefore only the construction of the isolation valve 24 is described. The isolation valve 24 includes a first port, which in this embodiment is an inlet port 74 connected to the first conduit 30, and the inlet port 74 is formed as part of a reservoir 76, and also formed as part of the reservoir 76 is a cap 78, and the cap 78 is connected to an overmold assembly 80. The overmold assembly 80 includes an overmold assembly cavity, shown generally at 82, and a second port, or outlet port 84, in fluid communication with the overmold assembly cavity 82. The outlet port 84 is connected to and in fluid communication with the second conduit 34.

Figure 4:
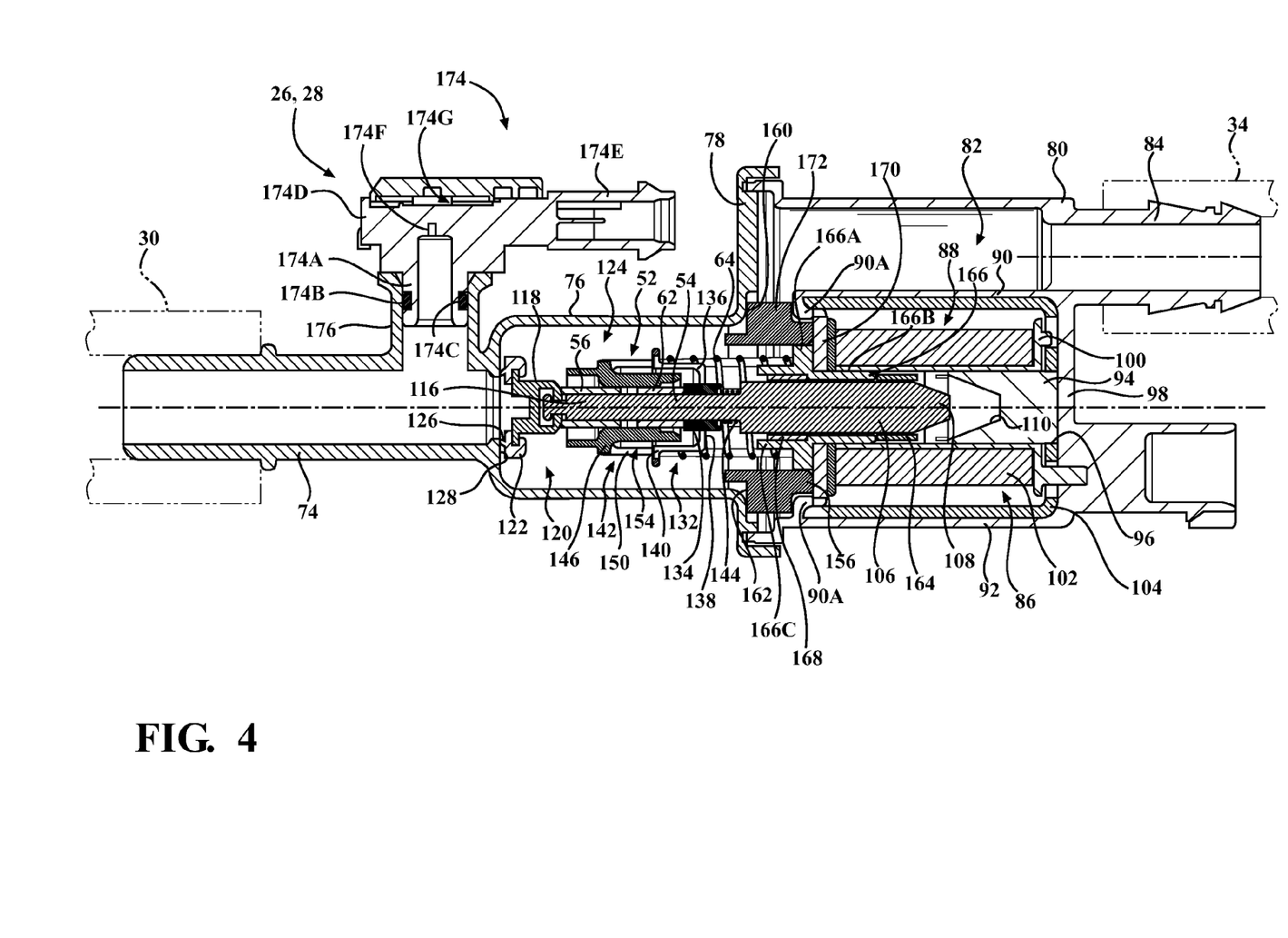
FIG. 4 is a sectional side view of an isolation valve assembly, according to embodiments of the present invention.
Figure 5A:
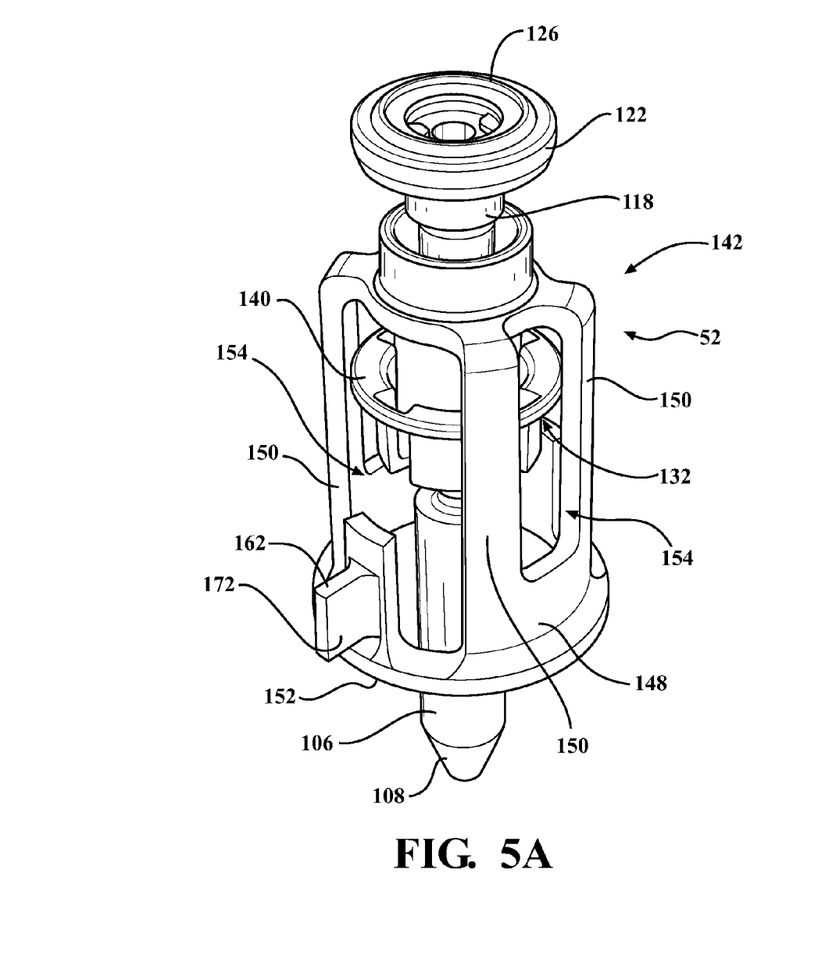
FIG. 5A is a perspective view of a latching mechanism, used as part of a tank isolation valve assembly, according to embodiments of the present invention.
Figure 5B:
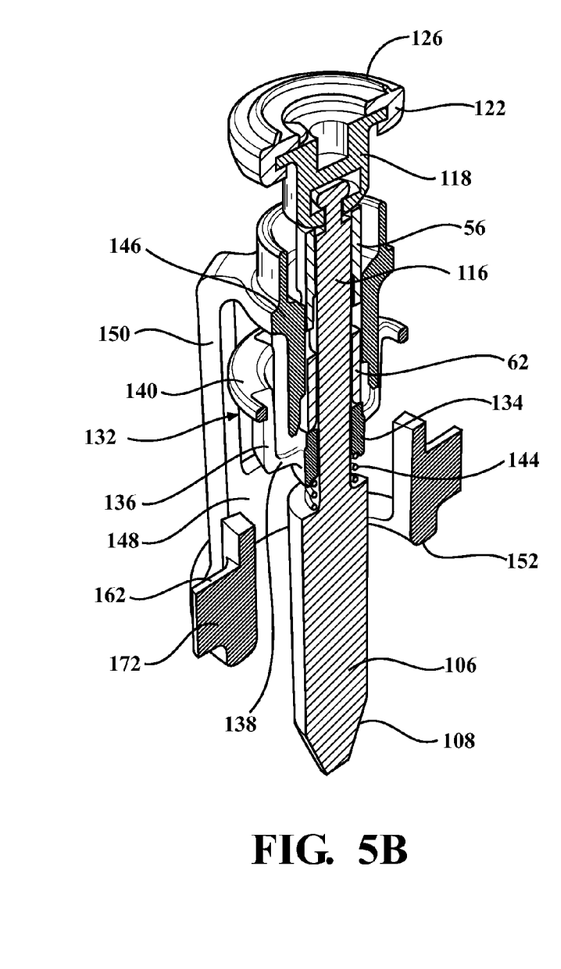
FIG. 5B is a sectional side view of a latching mechanism, used as part of a tank isolation valve assembly, according to embodiments of the present invention.

Disposed within the overmold assembly 80 is a solenoid assembly, shown generally at 86, which is part of the isolation valve assembly 22. The solenoid assembly 86 is disposed within a cavity, shown generally at 88, formed as part of the overmold assembly 80, and the cavity 88 includes an inner wall portion 90. Also forming part of the cavity 88 is an outer wall portion 92 of the overmold assembly 80. A retention feature 90A is formed as part of both the inner wall portion 90 and outer wall portion 92, and circumscribes the solenoid assembly 86, for securing the solenoid assembly 86 in the cavity 88.

The solenoid assembly 86 includes an outer stator insert 94 which is in contact with an upper wall 98 formed as part of the overmold assembly 80. The outer stator insert 94 is partially disposed in an aperture 96 formed as part of a housing 104, and the outer stator insert 94 is disposed between the upper wall 98 and a bobbin 100. The housing 104 is part of the solenoid assembly 86, and the inner wall portion 90 and outer wall portion 92 also form part of the housing 104. The bobbin 100 is surrounded by a coil 102, and there is a first bushing 164 which is surrounded by the bobbin 100, where the first bushing 164 has a shorter overall length than the bobbin 100, as shown in FIG. 4. The bushing 164 partially surrounds a moveable armature 54, and is adjacent an inner stator insert 166.

The armature 54 includes a large diameter portion 106 which extends into the solenoid assembly 86, and is partially surrounded by the inner stator insert 166, the first bushing 164, and the bobbin 100. The large diameter portion 106 also includes a tapered section 108 which selectively moves towards and away from a corresponding tapered section 110 formed as part of the outer stator insert 94. Disposed between a lower washer 170 and a load spring 64 is an outer flange portion 166A formed as part of the stator insert 166. The outer flange portion 166A is formed as part of the stator insert 166 between a small diameter portion 166B and a large diameter portion 166C of the stator insert 166. The small diameter portion 166B of the stator insert 166 is surrounded by the bobbin 100, and is adjacent the first bushing 164. The large diameter portion 166C is surrounded by part of the load spring 64, and the large diameter portion 166C surrounds a second bushing 168. Furthermore, mounted on the small diameter portion 166B is the lower washer 170, and the lower washer 170 is located between the outer flange portion 166A and the bobbin 100.

The second bushing 168, the small diameter portion 166B, and the first bushing 164 surround the large diameter portion 106 of the armature 54, where the large diameter portion 106 of the armature 54 is in sliding contact with and is supported by the bushings 164,168, and the armature 54 is able to move relative to the second bushing 168, the small diameter portion 166B, and the first bushing 164.

The armature 54 also includes a small diameter portion 116 which is integrally formed with the large diameter portion 106. The small diameter portion 116 extends into a reservoir cavity, shown generally at 124, formed as part of the reservoir 76, and is connected to a core portion 118 of a valve member, shown generally at 120. The valve member 120 also includes a stopper portion 122 connected to the core portion 118. The stopper portion 122 is made of rubber, or another type of flexible material, and includes a flange portion 126 which selectively contacts a contact surface 128 formed as part of the reservoir 76, where the contact surface 128 functions as a valve seat. The valve member 120 is moved by the armature 54 such that the flange portion 126 selectively contacts the contact surface 128, selectively placing the inlet port 74 in fluid communication with the reservoir cavity 124.

Disposed within the reservoir cavity 124 is a latching mechanism, shown generally in FIGS. 4, 5A-5B, and 6A-6F at 52. The latching mechanism 52 is connected to the valve member 120 of the isolation valve 24, which is moveable between an open position and a closed position. The latching mechanism 52 is used with the armature 54 to hold the valve member 120 in an open position even if the coil 102 is not energized. The armature 54 is part of the solenoid assembly 86, and a current is applied to the coil 102 to energize coil 102, and move the armature 54 and the valve member 120 away from the contact surface 128.

Figure 6A:
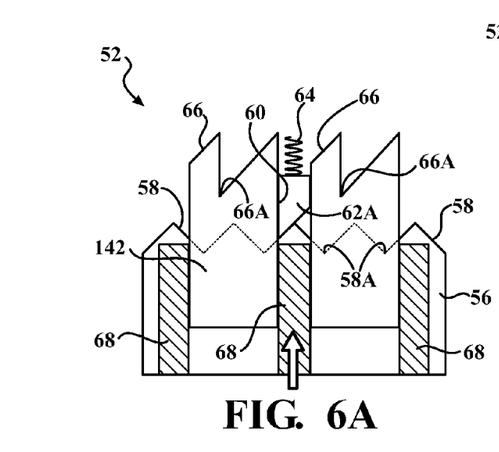
FIG. 6A is a first diagram of a latching mechanism used as part of an isolation valve assembly, where the tank isolation valve is in a closed position, according to embodiments of the present invention.

In FIGS. 4 and 6A, the valve member 120 is in a closed position. The mechanism 52 also includes an indexing latch 56 connected to the armature 54 such that the latch 56 moves with the armature 54, as shown in FIG. 4, and the latch 56 includes a first plurality of teeth 58 and several indexing splines 68. The mechanism 52 also includes several slots 60 formed as part of a guide 142, where the guide 142 also includes a second plurality of teeth 66. The mechanism 52 also includes an index mechanism 62 having at least one indexing tooth 62a (in this embodiment, the mechanism 62 has multiple teeth 62a, but only one is shown in FIGS. 6A-6F for demonstrative purposes), where the index mechanism 62 also surrounds the small diameter portion 116 of the armature 54, but is able to slide and move relative to the small diameter portion 116 of the armature 54. Force is applied to the index mechanism 62 by the load spring 64. The index mechanism 62 is also adjacent a spring cup, shown generally at 132. More specifically, the spring cup 132 includes an inner cylindrical portion 134 located next to the index mechanism 62. The inner cylindrical portion 134 also surrounds the small diameter portion 116, but is not connected to the small diameter portion 116 such that the spring cup 132 is also able to slide and move relative to the small diameter portion 116. The inner cylindrical portion 134 is connected to an outer cylindrical portion 136 with a central flange 138. Part of the load spring 64 surrounds the outer cylindrical portion 136 and is in contact with an outer flange 140 integrally formed with the outer cylindrical portion 136.

In addition to the load spring 64, there is also a return spring 144 which surrounds the small diameter portion 116, and is located between the spring cup 132 and the large diameter portion 106 of the armature 54. More specifically, the return spring 144 is between the inner cylindrical portion 134 of the spring cup 132 and the large diameter portion 106 of the armature 54, and the return spring 144 biases the spring cup 132 away from the large diameter portion 106 of the armature 54. The load spring 64 is between the outer flange 140 and the outer flange portion 166A of the inner stator insert 166, and biases the spring cup 132 and the index mechanism 62 away from the outer flange portion 166A of the inner stator insert 166. Depending on the configuration of the latching mechanism 52, the load spring 64 causes the spring cup 132 and index mechanism 62 to apply force to the latch 56 or the guide 142. Therefore, the latching mechanism 52 is biased in two different ways, one way is the return spring 144 biasing the spring cup 132 and the index mechanism 62 away from the large diameter portion 106 of the armature 54 (which is movable), and the other is the load spring 64 biasing the spring cup 132 and the index mechanism 62 away from the outer flange portion 166A of the inner stator insert 166 (which is stationary).

In addition to the slots 60 and the teeth 66, the guide 142 also includes an inner housing 146 which partially surrounds the indexing latch 56 and the index mechanism 62. Part of the inner housing 146 is surrounded by the spring cup 132.

Integrally formed with the inner housing 146 is an outer shield 148, where the outer shield 148 partially surrounds the load spring 64. The outer shield 148 is integrally formed with several support members 150, and the support members 150 are integrally formed with an upper bracket member 152. There are apertures, shown generally at 154, between each of the support members 150 which allow for the passage of air and purge vapor between the reservoir cavity 124 and the overmold assembly cavity 82. The upper bracket member 152 is in contact with the lower washer 170. There are also several outer bracket members 172 integrally formed with the upper bracket member 152.

More specifically, the diameter of the lower washer 170 is larger than the diameter of the outer flange portion 166A, such that the upper bracket member 152 is in contact with the lower washer 170, and the retention feature 90A is in contact with the lower washer 170. The cap 78 has an outer surface 160 in contact with a lower surface 162 of each outer bracket member 172. The outer bracket members 172 are therefore between the lower washer 170 and the outer surface 160 of the cap 78, and this location of the bracket members 152,172 relative to the overmold assembly 80 and the cap 78 properly positions the guide 142.

The latching mechanism 52 functions to hold the valve member 120 in an open position, even when the coil 102 is not energized. Referring to FIGS. 4 and 6A, the latching mechanism 52 is shown in a position which corresponds to the valve member 120 being in a closed position. When the coil 102 is energized enough to generate a magnetic force to overcome the force from the springs 64,144, the armature 54 and the indexing latch 56 move toward the stator insert 94, moving the valve member 120 away from the contact surface 128, placing the valve member 120 in an open position. The movement of the armature 54 towards the stator insert 94 causes force to be applied to the teeth 62a of the index mechanism 62 from at least one of the first plurality of teeth 58 formed as part of the indexing latch 56. The movement of the indexing latch 56 is guided by the movement of the indexing splines 68 moving in the slots 60. The force applied to the index mechanism 62 from the indexing latch 56 overcomes the force applied to the index mechanism 62 from the spring 64 by way of the spring cup 132 and moves the teeth 62a of the index mechanism 62 out of the slot 60, as shown in FIG. 6B.

Figure 6B:
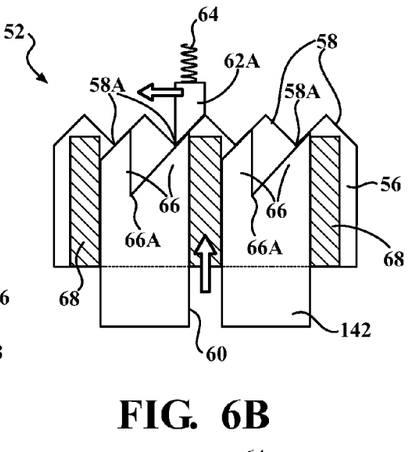
FIG. 6B is a diagram of a latching mechanism used as part of a tank isolation valve, where the latch mechanism is configured such that the tank isolation valve is moved to an open position, according to embodiments of the present invention.

It is shown in FIGS. 6A-6F that the vertexes 58A of the first plurality of teeth 58a are not in alignment with the vertexes 66a of the second plurality of teeth 66, which facilitates the rotation of the index mechanism 62. Each of the teeth 62a has an angled portion which also facilitates the rotation of the index mechanism 62. The coil 102 is energized to move the armature 54 and the indexing latch 56 toward the stator insert 94 enough to move the teeth 62a of index mechanism 62 out of the slot 60. Once the indexing latch 56 has moved the teeth 62a of the index mechanism 62 out of the slot 60, the pressure applied to the index mechanism 62 from the spring cup 132 and the load spring 64 and the return spring 144 pushes each tooth 62a towards a corresponding vertex 58a. This causes the index mechanism 62 to move (i.e., rotate about the small diameter portion 116 of the armature 54) as each tooth 62a slides towards one of the vertexes 58a in between two of the first plurality of teeth 58, as shown in FIG. 6B.

Figure 6C:
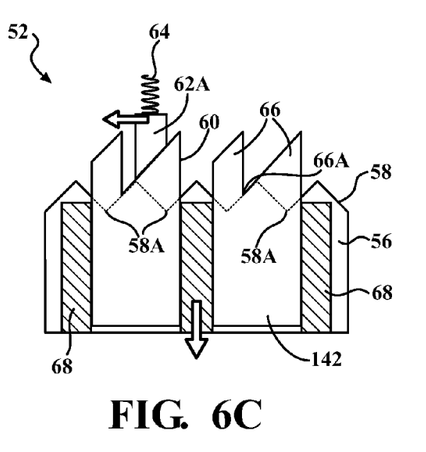
FIG. 6C is a diagram of a latching mechanism used as part of a tank isolation valve, where the latch mechanism is configured such that the tank isolation valve is held in an open position, according to embodiments of the present invention.
Figure 6D:
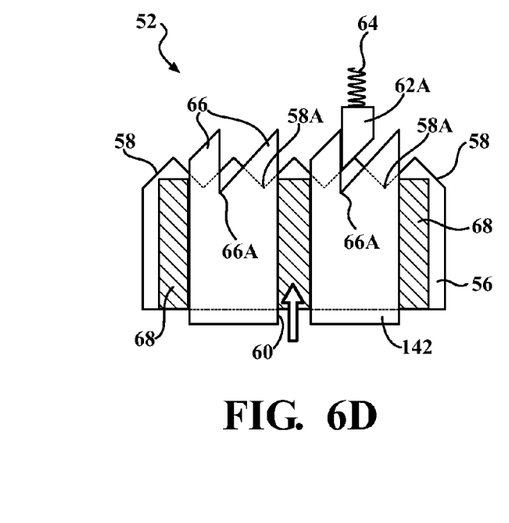
FIG. 6D is a first diagram of a latching mechanism used as part of a tank isolation valve, where the latch mechanism is configured such that the tank isolation valve is being released from an open position, according to embodiments of the present invention.
Figure 6E:
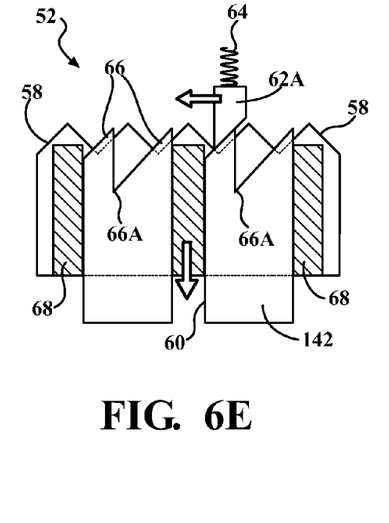
FIG. 6E is a second diagram of a latching mechanism used as part of a tank isolation valve, where the latch mechanism is configured such that the tank isolation valve is being released from an open position, according to embodiments of the present invention.

Once each tooth 62a is in contact with one of the vertexes 58a of the first plurality of teeth 58, each tooth 62a of the index mechanism 62 is also positioned such that each tooth 62a is between two of the second plurality of teeth 66 formed as part of the guide 142, also shown in FIG. 6B. The coil 102 is then de-energized, but the valve member 120 remains in the open position because the index mechanism 62 (and therefore the spring cup 132 and armature 54) is held in place by the guide 142. More specifically, after the coil 102 is de-energized, the indexing latch 56, and therefore the armature 54, move away from the index mechanism 62 enough to allow the teeth 58 of the indexing latch 56 to disengage from the teeth 62a of the index mechanism 62, while at the same time, the force of the springs 64,144 forces the teeth 62a to move toward the vertexes 66a of the second plurality of teeth 66 formed as part of the guide 142, as shown in FIG. 6C, rotating the index mechanism 62. Since the guide 142 is stationary, and the teeth 62a of the index mechanism 62 are interlocked with the teeth 66 of the guide 142, the index mechanism 62, spring cup 132, and armature 54 are not allowed to move to place the valve member 120 back in the closed position, but rather are held in place by the guide 142 (and the teeth 58 of the indexing latch 56 are disengaged from the teeth 62a of the index mechanism 62), to maintain the valve member 120 in the open position. This allows the purge vapor to escape from the tank 18 to the canister 32 as the valve member 120 is held in the open position, but does not draw any power from the vehicle battery to maintain the position of the valve 24 in the open position since the coil 102 is not energized.

Figure 6F:
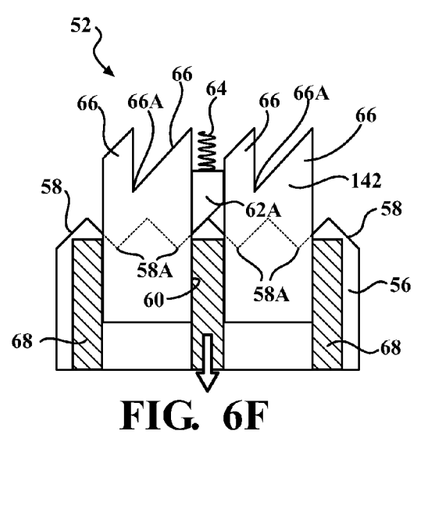
FIG. 6F is a second diagram of a latching mechanism used as part of a tank isolation valve, where the tank isolation valve is in a closed position, according to embodiments of the present invention.

Once it is desired to change the valve member 120 from the open position back to the closed position, the coil 102 is again energized, moving the armature 54 and the indexing latch 56 toward the stator insert 94 such that the first plurality of teeth 58 again engage and apply force to the teeth 62a of the index mechanism 62 to overcome the force applied to the index mechanism 62 from the springs 64,144 and lift the index mechanism 62 away from the second plurality of teeth 66. As mentioned above, the vertexes 58A of the first plurality of teeth 58a are not in alignment with the vertexes 66a of the second plurality of teeth 66. When the valve member 120 is in the open position, and the teeth 62a of the index mechanism 62 are held in place by the teeth 66 of the guide 142, the teeth 62a of the index mechanism 62 are not in alignment with the vertexes 58a of the first plurality of teeth 58, shown in FIG. 6C. Once the teeth 62a of the index mechanism 62 have disengaged from the second plurality of teeth 66, and are only engaged with the first plurality of teeth 58, the teeth 62a move toward the corresponding vertexes 58a (because of the force from the springs 64,144), rotating the index mechanism 62, such that the teeth 62a are no longer in alignment with the vertexes 66a of the second plurality of teeth 66. The coil 102 is then again de-energized, and the armature 54 and indexing latch 56 move away from the stator insert 94, and the teeth 62a reengage with the second plurality of teeth 66 of the guide 142. However, instead of moving towards the vertexes 66a due to the force of the springs 64,144, the each tooth 62a moves towards a corresponding slot 60, allowing the index mechanism 62 to move further away from the stator insert 94, and each tooth 62a to move into a corresponding slot 60, as shown in FIG. 6F, which also results in the force from the springs 64,144 moving the armature 54, indexing latch 56, index mechanism 62, and spring cup 132 further away from the stator insert 94, and the valve member 120 to move back to the closed position, as shown in FIGS. 4, 6A, and 6F.

Figure 3:
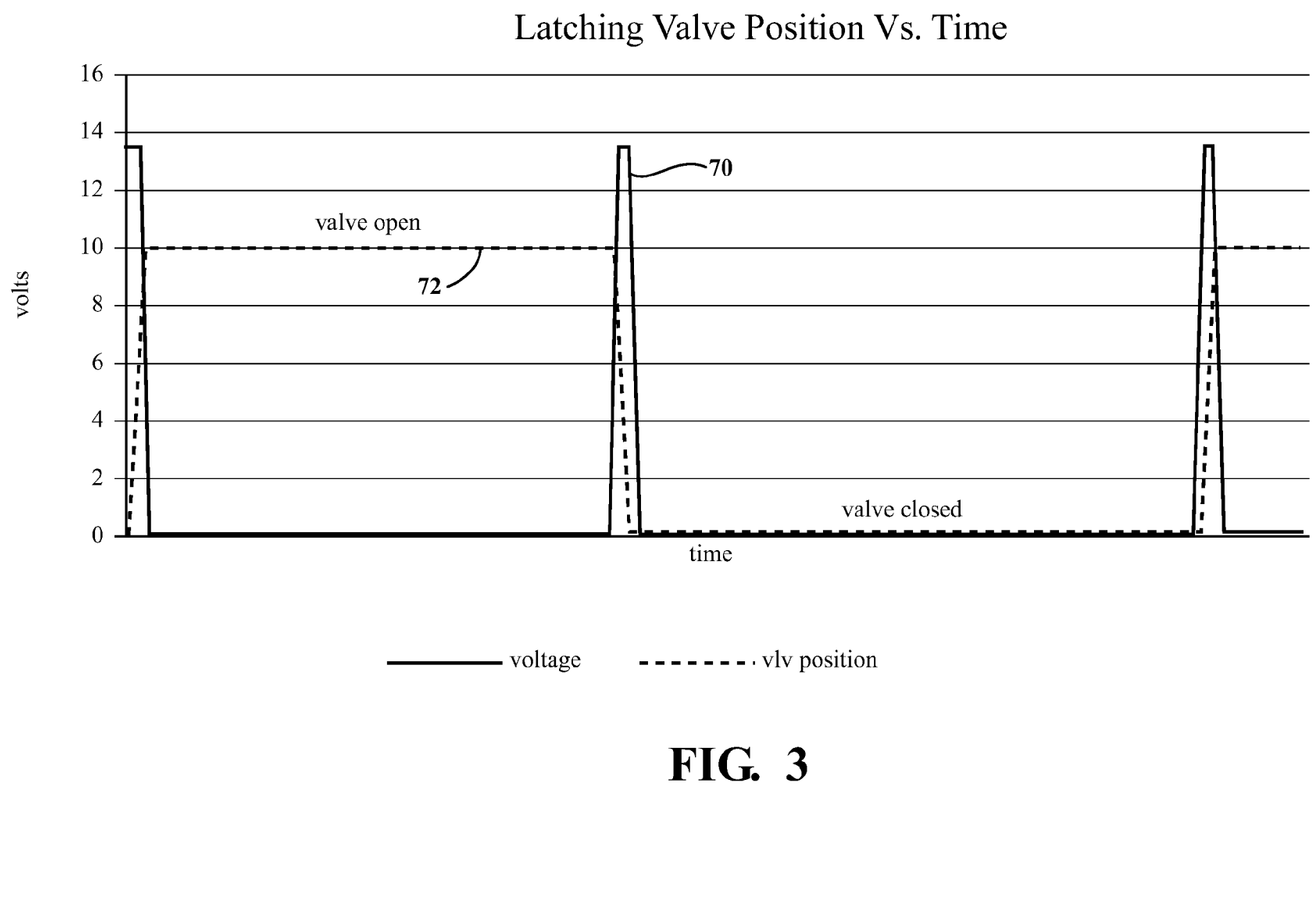
FIG. 3 is a graph depicting the voltage versus valve position of an isolation valve assembly, according to embodiments of the present invention.

The solenoid assembly 86 and therefore the coil 102 is only energized when the valve member 120 is being changed between the open position and the closed position. Once the valve member 120 is in the open position, the coil 102 is de-energized. Furthermore, once the valve member 120 is in the closed position, the coil 102 is de-energized. An example of this is shown in FIG. 3, where voltage 70 of the solenoid assembly 86 and the position 72 of the valve member 120 are shown. The voltage 70 is applied to the coil 102, and therefore the armature 54, for about 30 milliseconds, the armature 54 moves the indexing latch 56 and the index mechanism 62, allowing the valve member 120 to change to the open position, as described above. Once the valve member 120 is in the open position, the coil 102 is then de-energized, the voltage 70 then drops to zero, and the valve member 120 is held in the open position by the latching mechanism 52. The voltage 70 is then re-applied to the coil 102, which then re-energizes the coil 102, and the latching mechanism 52 is actuated to change the valve member 120 from the open position to the closed position. The function of the latching mechanism 52 allows to the coil 102 of the solenoid assembly 86 to be de-energized, and therefore no power is drained from the battery of the vehicle, while still providing for the valve member 120 to be held in the open position or closed position. Energy is only used in intervals of about 30 milliseconds when changing the valve member 120 between the open and closed positions, as shown in FIG. 3, and energy is not used when the valve member 120 is held in the open position or the closed position.

Figure 2:
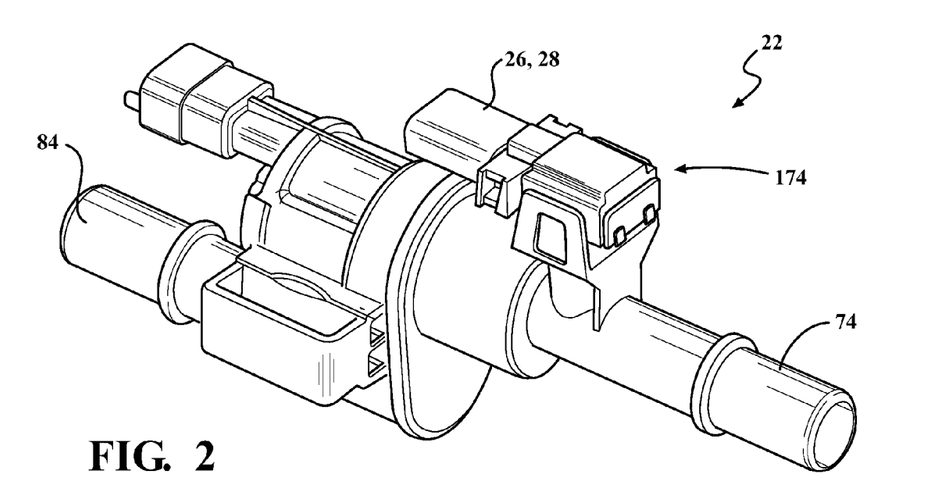
FIG. 2 is a perspective view of an isolation valve assembly, according to embodiments of the present invention.

Another feature of the system 10 is that the pressure sensor 26 and temperature sensor 28 may be integrated with the tank isolation valve 24, as shown in FIGS. 1, 2, and 4. This eliminates at least one hose, and two hose connections, improving the overall design of the isolation valve assembly 22, allowing the isolation valve assembly 22 to meet more stringent packaging requirements. Referring again to FIGS. 2 and 4, the pressure sensor 28 and temperature sensor 28 are formed as a single sensing unit, shown generally at 174. Integrally formed as part of the inlet port 74 is a side port 176, which is perpendicular to the inlet port 74. The sensing unit 174 includes a port 174A, which includes a groove 174B having an O-ring 174C disposed in the groove 174B. The port 174A is disposed in the side port 176, and the O-ring 174C provides a sealing function between the ports 174A,176. The port 174A is integrally formed with a housing 174D, and also integrally formed with the housing 174D is a connector 174E, which is connectable with a corresponding connector to place the sensing unit 174 in electrical communication with another device, such as the ECU of the vehicle, or the like.

Disposed in the port 174A is a sensing element 174F, and the sensing element 174F in this embodiment may include a pressure sensing element and a temperature sensing element, which may be used for detecting both pressure and temperature in the port 174A. The sensing element 174F is in electrical communication with a circuit board, shown generally at 174G, and the circuit board 174G is also in electrical communication with the connector 174E. The location and integration of the sensing unit 174 with the tank isolation valve 24 (more specifically, the connection of the sensing unit 174 with the inlet port 74), not only provides the advantages mentioned above, the sensing unit 174 is able to detect the pressure and temperature in the inlet port 74, first conduit 30, and fuel tank 18. Because the voltage 70 is only applied to the coil 102 in intervals of about 30 milliseconds, as mentioned above, interference with the operation of the pressure sensor 26 when the coil 102 is energized is minimized or eliminated.

In other embodiments, another latching mechanism 52 is also incorporated for use with the canister vent valve 42 also having a valve member 120. The pressure sensor 46 and temperature sensor 46A may also be integrated with the canister vent valve 42 in the same way as the pressure sensor 28 and temperature sensor 28 are integrated with the tank isolation valve 24, as previously described. The latching mechanism 52 also allows for the valve member 120 of the canister vent valve 42 to change between the open position and closed positions, and remain in the open or closed positions, without drawing power from the vehicle battery. This operation also minimizes the interference with the operation of the pressure sensor 46.

The latching mechanism 52 is not limited to having the components described above. In still other embodiments, the latching mechanism 52 may be a permanent magnet with a double coil. In yet another embodiment, the latching mechanism 52 may include a permanent magnet, where the polarity is reversed at the terminals to open and close the valve member 120.

The system 10 also includes on-board diagnostic (OBD) check functions as well. Referring to FIGS. 1 and 7-10, the isolation valve assembly 22 is located between the fuel tank 18 and the vapor canister 32, and the canister vent valve 42 is located between the vapor canister 32 and the filter 50. During the operation of the system 10, the pressure sensor 26 provides a reading of the pressure in the first conduit 30 and the fuel tank 18 (hereafter referred to as "P1"), and the other pressure sensor 46 provides a reading of the pressure in the fifth conduit 44, the canister 32, the second conduit 34, and the third conduit 38 (hereafter referred to as "P2"). The two valves 24,42 are opened and closed in different configurations and under different conditions to perform the various OBD check functions. There are four different sets of conditions, and therefore four possible configurations of the two valves 24,42, which are used to perform the different OBD check functions. In order to determine if the system 10 is functioning correctly, and for the diagnostic test to be complete, the system 10 must pass the test under each of the four conditions described below, and shown in FIGS. 7-10.

Figure 7:
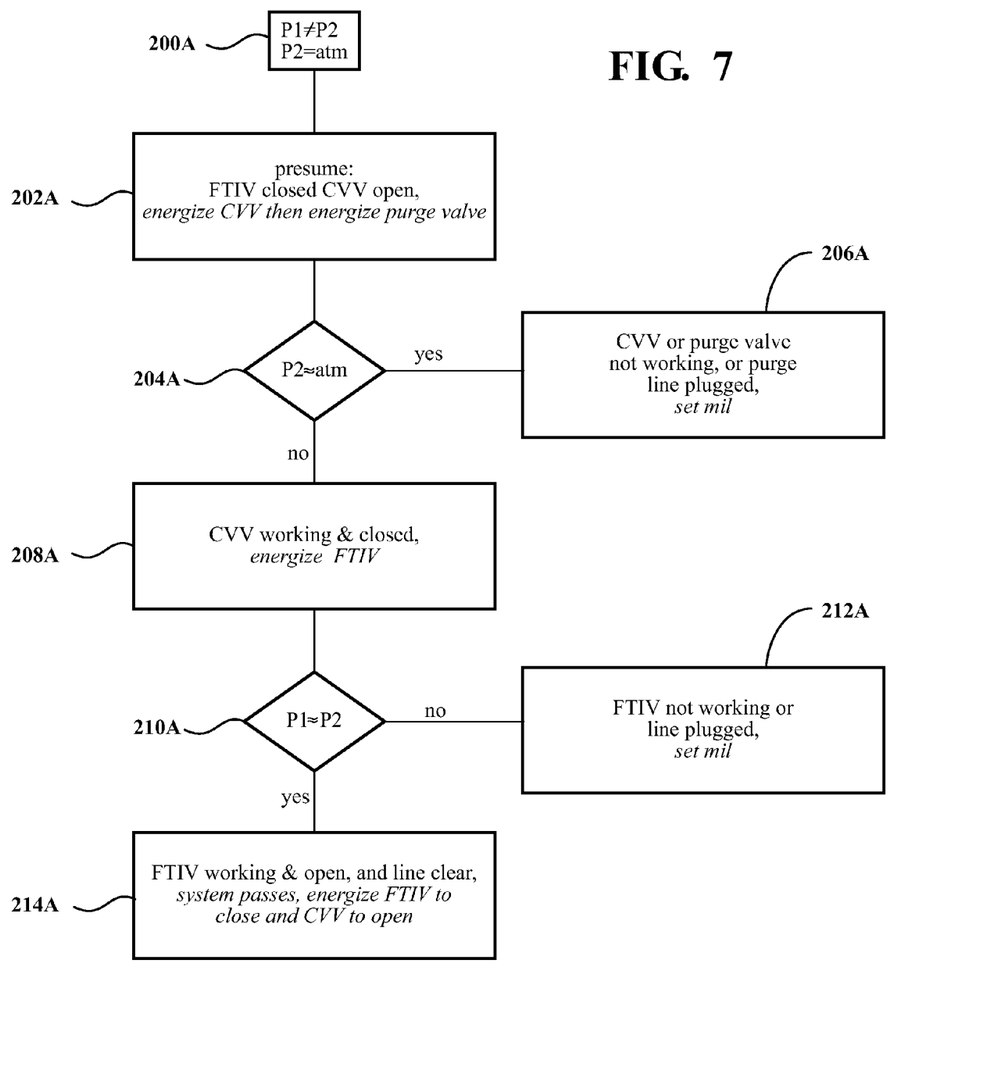
FIG. 7 is a flowchart having the steps used to perform a diagnostic test on a vapor purge system under a first set of operating conditions, according to embodiments of the present invention.

Referring to FIGS. 1 and 7, the first set of conditions that are used to perform the diagnostic test as shown at step 200A occur when P1 is not equal to P2, and that P2 is substantially equal to atmospheric pressure. At step 202A, it is presumed that the isolation valve 24 and the purge valve 36 are closed, and that the vent valve 42 is open. At step 202A, the vent valve 42 is commanded to close, and the purge valve 36 is commanded to open. At step 204A, a reading is taken by the second pressure sensor 46 to determine if P2 is substantially equal to atmospheric pressure. If P2 is still substantially equal to atmospheric pressure, then at step 206A an indication is provided that either the vent valve 42 or the purge valve 36 are malfunctioning, or the third conduit 38 is plugged. If P2 is no longer equal to atmospheric pressure, then the vent valve 42 is functioning correctly, and at step 208A, the vent valve 42 is closed, and the isolation valve 24 is opened.

Once the vent valve 42 is closed, the isolation valve 24 is commanded to open, another measurement is taken by the sensors 26,46 at step 210A to determine if P1 is substantially equal to P2. If P1 is not equal to P2, this is an indication that the isolation valve 24 is malfunctioning, and an indication is provided that the isolation valve 24 is malfunctioning at step 212A. If, at step 210A, P1 is substantially equal to P2, then at step 214A, the isolation valve 24 is functioning correctly, and the system 10 passes this part of the diagnostic test. Also at step 214A, the isolation valve 24 is closed, and the vent valve 42 is opened.

Figure 8:
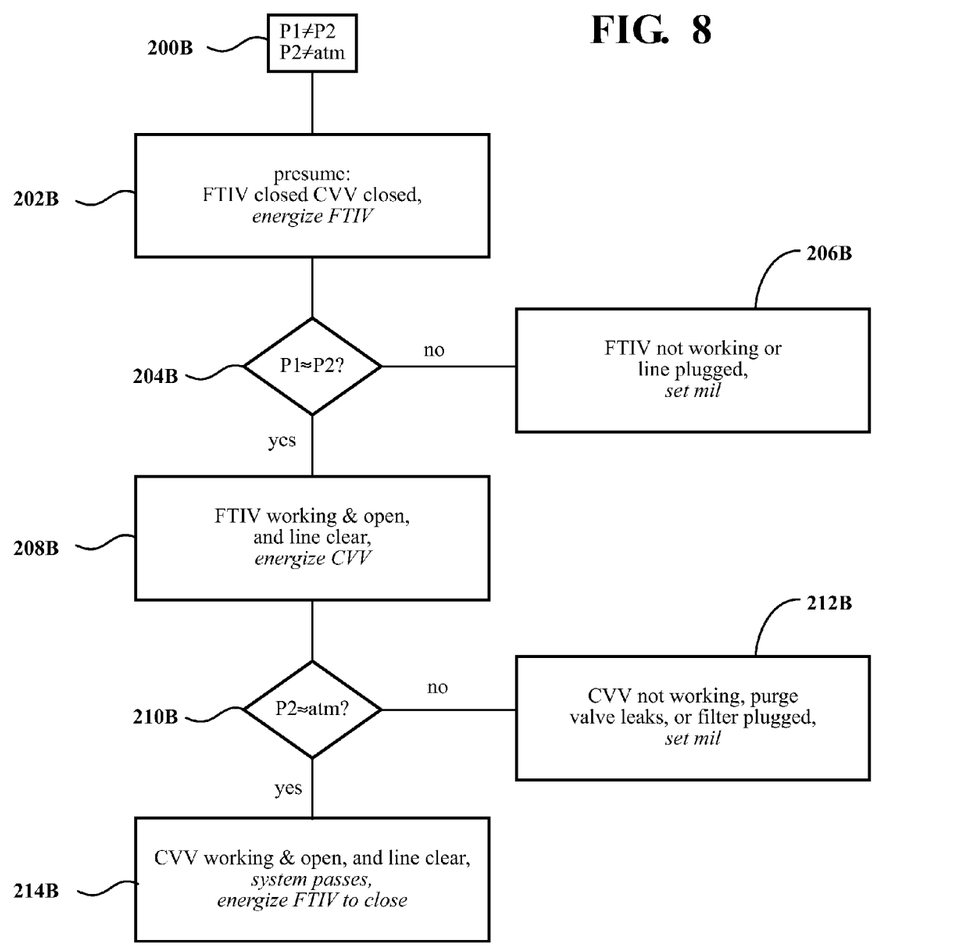
FIG. 8 is a flowchart having the steps used to perform a diagnostic test on a vapor purge system under a second set of operating conditions, according to embodiments of the present invention.

Referring to FIGS. 1 and 8, the second set of conditions that are used to perform the diagnostic test as shown at step 200B occur when P1 is not equal to P2, and P2 is not equal to atmospheric pressure. It is presumed, at step 202B, that the isolation valve 24 and the vent valve 42 are both closed, and the isolation valve 24 is then commanded to open. A pressure reading is taken at step 204B to determine if P1 is substantially equal to P2 after the isolation valve 24 is commanded to open. If P1 is not equal to P2, then an indication is provided at step 206B that the isolation valve 24 is malfunctioning. If P1 is substantially equal to P2, then the isolation valve 24 is functioning correctly, and at step 208B the vent valve 42 is then commanded to open.

Once it is known that the isolation valve 24 is functioning correctly, and the vent valve 42 is commanded to open at step 208B, another pressure reading is taken at step 210B by the sensors 26,46 to determine if P2 is substantially equal to atmospheric pressure. If P2 is not equal to atmospheric pressure, then at step 212B an indication is provided that either the vent valve 42 is malfunctioning, the purge valve 36 leaks, or the filter 50 is plugged. If, at step 210B, P2 is substantially equal to atmospheric pressure, then the vent valve 42 is functioning correctly and in the open position, the conduits are clear, and the isolation valve 24 is placed in the closed position.

Figure 9:
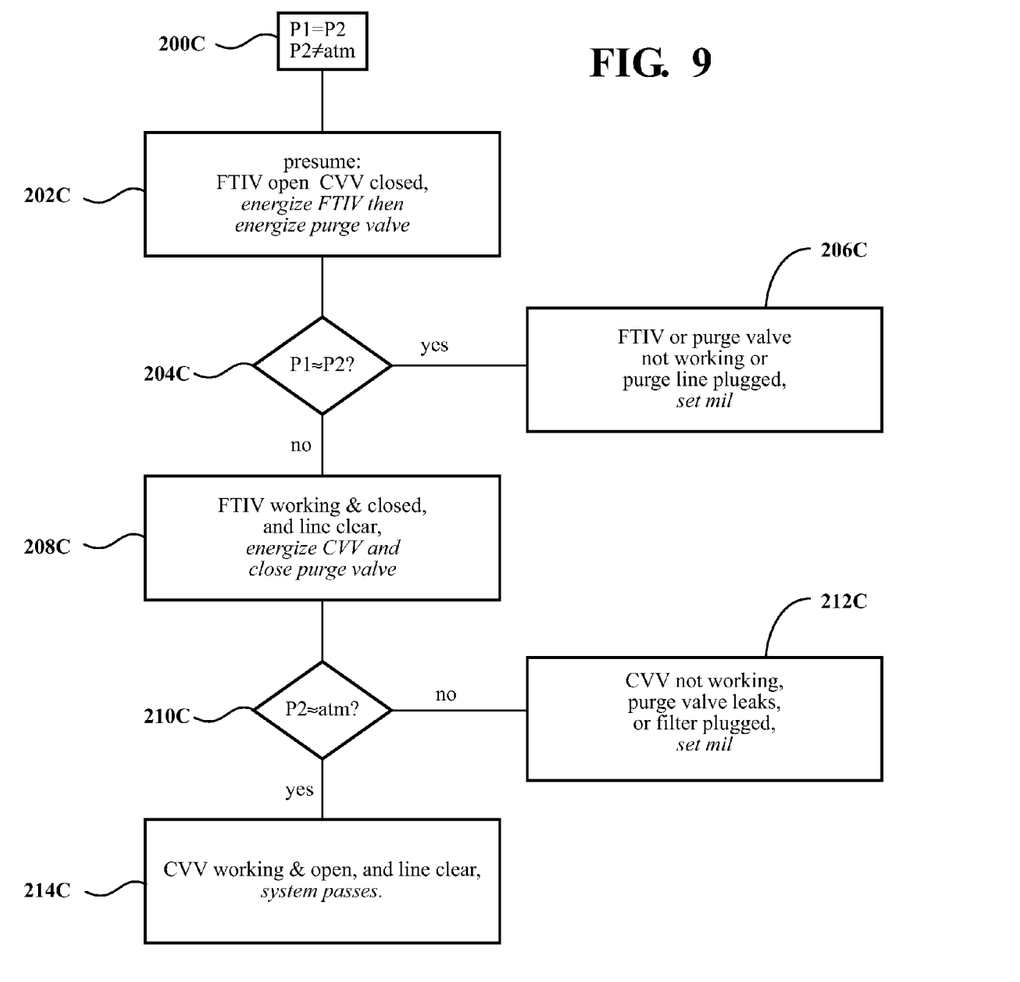
FIG. 9 is a flowchart having the steps used to perform a diagnostic test on a vapor purge system under a third set of operating conditions, according to embodiments of the present invention.

Referring to FIGS. 1 and 9, the third set of conditions that are used to performed the diagnostic test at shown at step 200C occur when P1 is substantially equal to P2, and P2 is not equal to atmospheric pressure. Under these conditions, at step 202C it is presumed that both valves 24,42 are in closed positions, the isolation valve 24 is energized to change to the open position, and the purge valve 36 is then energized to change to the open position. Then, at step 204C, a pressure reading is taken by the sensors 26,46 to determine if P1 is still substantially equal to P2. If P1 is still substantially equal to P2 at step 204C, then at step 206C an indication is provided that either the isolation valve 24 or the purge valve 36 is malfunctioning, or that the third conduit 38 is plugged. If P1 is not equal to P2 at step 204C, then the isolation valve 24 is functioning correctly, and at step 208C, the vent valve 42 is energized to open the vent valve 42, and the purge valve 36 is closed.

Once the purge valve 36 is closed and the vent valve 42 is opened at step 208C, another pressure measurement is taken by the sensors 26,46 at step 210C to determine if P2 is substantially equal to atmospheric pressure. If, at step 210C, P2 is not equal to atmospheric pressure, then at step 212C an indication is provided that either the vent valve 42 is malfunctioning properly, there is a leak in the purge valve 36, or the filter 50 is plugged. If, at step 210C, P2 is substantially equal to atmospheric pressure, then the vent valve 42 is functioning correctly and in an open position, the sixth conduit 48 is clear, and the system 10 passes this part of the diagnostic test.

Figure 10:
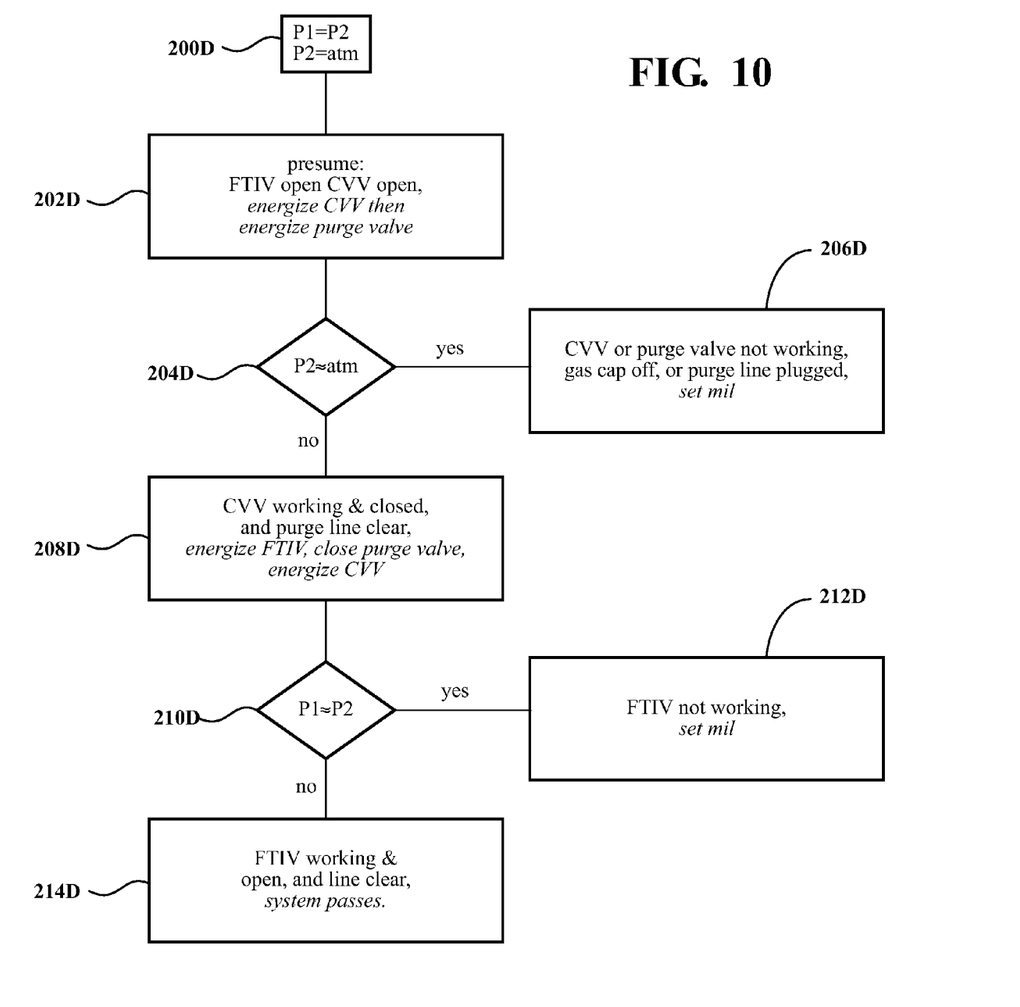
FIG. 10 is a flowchart having the steps used to perform a diagnostic test on a vapor purge system under a fourth set of operating conditions, according to embodiments of the present invention.

Referring to FIGS. 1 and 10, the fourth set of conditions that are used to perform the diagnostic test at step 200D occur when P1 is substantially equal to P2, and P2 is substantially equal to atmospheric pressure. Under these conditions, at step 202D it is presumed that the isolation valve 24 is open, the vent valve 42 is also open, and the vent valve 42 is commanded to change to a closed position, and additionally, the purge valve 36 is commanded to change to an open position. A pressure measurement is taken by the sensors 26,46 at step 204D, and if P2 is still substantially equal to atmospheric pressure, then an indication is provided that either the vent valve 42 or the purge valve 36 is malfunctioning, the cap for the fuel tank 18 has been removed, or the third conduit 38 is plugged. If, at step 204D, P2 is no longer equal to atmospheric pressure, then the vent valve 42 is functioning correctly and in a closed position, the third conduit 38 is clear, and at step 208D, the isolation valve 24 and purge valve 36 are changed to a closed position, and the vent valve 42 is changed to an open position.

Once the isolation valve 24 and the purge valve 36 are closed, and the vent valve 42 is opened, another pressure reading is taken, at step 210D, to determine if P1 is substantially equal to P2. If, at step 210D, P1 is substantially equal to P2, then an indication is provided that the isolation valve 24 is malfunctioning at step 212D. If P1 is not equal to P2, then, at step 210D, the isolation valve 24 is functioning correctly and in the open position, and the system 10 passes the diagnostic test.

In addition to being able to perform the diagnostic test, the vapor purge system 10 also functions to configure the tank isolation valve 24 and canister vent valve 42 to allow for the removal of purge vapor during refueling, and for relief of vacuum pressure as the fuel levels in the fuel tank 18 decrease as fuel is consumed during vehicle travel. The tank isolation valve 24 and the canister vent valve 42 may also be configured to relieve positive pressure build up in the fuel tank 18 due increases in temperature, or relief of vacuum pressure build up in the fuel tank 18 due to decreases in temperature.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An apparatus, comprising:
   a latching mechanism, including:
   an armature;
   an indexing latch connected to the armature;
   an index mechanism surrounding a portion of the armature such that the index mechanism moves relative to the armature, the index mechanism selectively engaged with the indexing latch;
   a guide, the index mechanism selectively engaged with the guide;
   a valve, the armature connected to the valve;
   a valve seat, the valve in contact with the valve seat when the valve is in a closed position, and the valve is moved away from the valve seat when the valve is in an open position;
   a first plurality of teeth formed as part of the indexing latch;
   a second plurality of teeth formed as part of the guide;
   a plurality of slots formed as part of the guide; and
   a plurality of indexing teeth formed as part of the index mechanism;
   wherein the indexing latch is engaged with the index mechanism when the valve is in the closed position, and the armature moves the indexing latch and valve, causing the indexing latch to move the index mechanism such that the index mechanism rotates about the armature and engages with the guide, placing the valve in the open position, and when the valve is in the open position, the armature again moves the indexing latch and valve such that the index mechanism disengages from the guide, and rotates about the armature, allowing the armature to move the indexing latch and valve such that the valve is placed back in the closed position, and each of the plurality of indexing teeth are disposed in a corresponding one of the plurality of slots and engaged with the first plurality of teeth when the valve is in the closed position, and the plurality of indexing teeth are removed from the plurality of slots, disengage from the first plurality of teeth, and engage with the second plurality of teeth when the valve is in the open position.

2. The apparatus of claim 1, further comprising:
   a bobbin;
   an inner stator insert partially surrounded by the bobbin, the armature movable relative to the bobbin and the inner stator insert;
   a coil substantially surrounding the bobbin;
   a spring cup, a portion of the spring cup surrounding part of the armature, and a portion of the spring cup surrounding the guide;
   a load spring disposed between the inner stator insert and the spring cup, the load spring biasing the index mechanism away from the inner stator insert; and
   a return spring substantially surrounding part of the armature such that the return spring is in contact with part of the armature and the spring cup, the return spring biasing the index mechanism away from the portion of the armature surrounded by the inner stator insert;
   wherein the coil is energized to move the armature and the valve against the force of the load spring and the return spring and away from the valve seat when the valve is in the closed position, the indexing latch is engaged with the index mechanism, and the valve is in contact with the valve seat, such that when the armature, the valve, and the indexing latch move far enough away from the valve seat, the index mechanism becomes engaged with the guide, maintaining the valve in the open position when the coil is then de-energized, and when the valve is in the open position, the coil is again energized to move the armature, the valve, and index mechanism towards the bobbin and away from the guide, such that the index mechanism disengages from the guide and reengages with the indexing latch, and when the coil is then again de-energized, the valve moves to the closed position.

3. The apparatus of claim 2, the armature further comprising:
   a large diameter portion partially surrounded by the inner stator insert, the return spring disposed between the large diameter portion and the spring cup such that the return spring biases the spring cup away from the large diameter portion of the armature; and
   a small diameter portion integrally formed with the large diameter portion, the indexing latch and the valve connected to the small diameter portion, and the small diameter portion partially surrounded by the index mechanism and the return spring;
   wherein the large diameter portion moves relative to the bobbin as the coil is energized and de-energized, and the movement of the large diameter portion is guided by the inner stator insert.

4. The apparatus of claim 2, the spring cup further comprising:
   an inner cylindrical portion located next to the index mechanism;
   a central flange integrally formed with the inner cylindrical portion;
   an outer cylindrical portion integrally formed with the central flange, the outer cylindrical portion circumscribed by part of the load spring; and
   an outer flange integrally formed with the outer cylindrical portion, the load spring in contact with the outer flange;

wherein the load spring is disposed between the outer flange and the inner stator insert, and biases the spring cup and the index mechanism away from the inner stator insert, such that the valve is biased towards a closed position when the index mechanism is engaged with the indexing latch.

5. The apparatus of claim 1, further comprising:
an overmold assembly cavity;
a reservoir cavity, the valve and the valve seat located in the reservoir cavity;
a fuel tank in fluid communication with the overmold assembly cavity; and
a carbon canister in fluid communication with the reservoir cavity;
wherein the valve is changed between the open position and the closed position to control vacuum pressure in the fuel tank, and the flow of purge vapor from the fuel tank, through the reservoir cavity, the overmold assembly cavity, and into the canister.

6. The apparatus of claim 1, further comprising:
a plurality of indexing splines formed as part of the indexing latch;
wherein each one of the plurality of indexing splines slides in one of the plurality of slots as the indexing latch moves relative to the guide.

7. The apparatus of claim 1, wherein the first plurality of teeth are positioned relative to the second plurality of teeth such that when the valve is in the closed position, and the coil is energized, moving the indexing latch and the index mechanism away from the valve seat such that the first plurality of teeth move the plurality of indexing teeth out of the plurality of slots, causing the index mechanism to rotate relative to the armature, and engage the second plurality of teeth when the coil is de-energized allowing the first plurality of teeth to disengage from the plurality of indexing teeth, and when the plurality of indexing teeth are engaged with the second plurality of teeth and the valve is in the open position, the coil is again energized to reengage the first plurality of teeth with the indexing teeth such that the plurality of indexing teeth are disengaged from the second plurality of teeth, causing the index mechanism to rotate relative to the armature, and each of the plurality of indexing teeth to move back into a corresponding one of the plurality of slots, allowing the armature and the valve to move toward and contact the valve seat, placing the valve back in the closed position.

8. A latching mechanism, comprising:
an armature;
an indexing latch connected to the armature;
an index mechanism surrounding a portion of the armature such that the index mechanism moves relative to the armature, the index mechanism selectively engaged with the indexing latch;
a guide, the index mechanism selectively engaged with the guide;
a spring cup, a portion of the spring cup surrounding part of the armature, and a portion of the spring cup surrounding the guide; a return spring substantially surrounding part of the armature such that the return spring is in contact with part of the armature and the spring cup, the return spring biasing the index mechanism away from the armature;
a valve, the armature connected to the valve;
a valve seat, the valve in contact with the valve seat when the valve is in the closed position; and a load spring surrounding a portion of the spring cup, the load spring biasing the index mechanism and the valve towards the valve seat;
wherein the indexing latch is engaged with the index mechanism when the valve is in the closed position, and the armature moves the indexing latch and valve against the force of the load spring and the return spring such that the indexing latch moves the index mechanism to cause the index mechanism to rotate about the armature and engage with the guide, placing the valve in the open position, and when the valve is in the open position, the armature is again moved against the force of the load spring and the return spring to move the indexing latch and valve such that the index mechanism disengages from the guide and again rotates about the armature, allowing the load spring and the return spring to move the armature, the indexing latch, and the valve such that the valve is placed back in the closed position.

9. The latching mechanism of claim 8, further comprising:
a bobbin;
an inner stator insert partially surrounded by the bobbin, the armature movable relative to the bobbin and the inner stator insert, and the load spring disposed between the bobbin and the spring cup; and
a coil substantially surrounding the bobbin;
wherein the coil is energized to move the indexing latch, the armature, and the valve against the force of the load spring and the return spring to rotate the index mechanism about the armature such that the index mechanism engages with the guide as the valve is changed from the closed position to the open position, allowing the coil to be de-energized with the valve is in the open position, and when the valve is in the open position, the coil is re-energized to again move the armature and valve against the force of the load spring and the return spring, causing the index mechanism to disengage with the guide and rotate about the armature, the coil is then de-energized, and the return spring and load spring move the armature, latching mechanism, and valve such that the valve is placed back in the closed position.

10. The latching mechanism of claim 9, the armature further comprising:
a large diameter portion partially surrounded by the inner stator insert, the return spring disposed between the large diameter portion and the spring cup such that the return spring biases the spring cup away from the large diameter portion of the armature; and
a small diameter portion integrally formed with the large diameter portion, the indexing latch and the valve connected to the small diameter portion, and the small diameter portion partially surrounded by the index mechanism and the return spring;
wherein the large diameter portion moves relative to the bobbin as the coil is energized and de-energized, and the movement of the large diameter portion is guided by the inner stator insert.

11. The latching mechanism of claim 9, the spring cup further comprising:
an inner cylindrical portion located next to the index mechanism;
a central flange integrally formed with the inner cylindrical portion;
an outer cylindrical portion integrally formed with the central flange, the outer cylindrical portion circumscribed by part of the load spring; and an outer flange integrally formed with the outer cylindrical portion, the load spring in contact with the outer flange;
wherein the load spring is disposed between the outer flange and the inner stator insert, and biases the spring cup and the index mechanism away from the inner stator insert, such that the valve is biased towards a closed position when the index mechanism is engaged with the indexing latch.

12. The latching mechanism of claim 8, further comprising:
an overmold assembly cavity;
a reservoir cavity, the valve and the valve seat located in the reservoir cavity;
a fuel tank in fluid communication with the overmold assembly cavity; and a carbon canister in fluid communication with the reservoir cavity;
wherein the valve is changed between the open position and the closed position to control vacuum pressure in the fuel tank, and the flow of purge vapor from the fuel tank, through the reservoir cavity, the overmold assembly cavity, and into the canister.

13. The latching mechanism of claim 8, further comprising:
a first plurality of teeth formed as part of the indexing latch;
a second plurality of teeth formed as part of the guide;
a plurality of slots formed as part of the guide; and
a plurality of indexing teeth formed as part of the index mechanism;
wherein each of the plurality of indexing teeth are disposed in a corresponding one of the plurality of slots and engaged with the first plurality of teeth when the valve is in the closed position, and the plurality of indexing teeth are removed from the plurality of slots and engaged with the second plurality of teeth when the valve is in the open position.

14. The latching mechanism of claim 13, further comprising:
a plurality of indexing splines formed as part of the indexing latch;
wherein each one of the plurality of indexing splines slides in one of the plurality of slots as the indexing latch moves relative to the guide.

15. The latching mechanism of claim 13, wherein the first plurality of teeth are positioned relative to the second plurality of teeth such that when the valve is in the closed position, and the coil is energized, moving the indexing latch and the index mechanism away from the valve seat such that the first plurality of teeth move the plurality of indexing teeth out of the plurality of slots, causing the index mechanism to rotate relative to the armature, and engage the second plurality of teeth when the coil is de-energized allowing the first plurality of teeth to disengage from the plurality of indexing teeth, and when the plurality of indexing teeth are engaged with the second plurality teeth and the valve is in the open position, the coil is again energized to reengage the first plurality of teeth with the indexing teeth such that the plurality of indexing teeth are disengaged from the second plurality of teeth, causing the index mechanism to rotate relative to the armature, and each of the plurality of indexing teeth to move back into a corresponding one of the plurality of slots, allowing the armature and the valve to move toward and contact the valve seat, placing the valve back in the closed position.

16. A latching mechanism for a fuel tank isolation valve, comprising:

a bobbin;
a coil substantially surrounding the bobbin;
an inner stator insert partially surrounded by the bobbin;
an armature at least partially surrounded by the inner stator insert, the armature having a large diameter portion and a small diameter portion;
an indexing latch connected to a portion of the small diameter portion of the armature, such that the indexing latch moves with the armature;
an index mechanism which substantially surrounds a portion of the small diameter portion of the armature, the index mechanism selectively engaged with the indexing latch;
a spring cup substantially surrounding a portion of the small diameter portion of the armature, the spring cup adjacent the index mechanism;
a load spring disposed between the inner stator insert and the spring cup, such that the load spring is in contact with the spring cup and biases the spring cup away from the inner stator insert;
a return spring substantially surrounding part of the small diameter portion of the armature, the return spring disposed between the large diameter portion of the armature and the spring cup, the return spring biasing the spring cup away from the large diameter portion of the armature;
an overmold assembly cavity, the coil and the bobbin adjacent the overmold assembly cavity;
a reservoir cavity in fluid communication with the overmold assembly cavity, the valve, the valve seat, the indexing latch, the index mechanism, and the spring cup all disposed in the reservoir cavity;
a guide in contact with and adjacent the bobbin, the index mechanism selectively engaged with the guide, and the guide located in the reservoir cavity;
a valve, the small diameter portion of the armature connected to the valve; and a valve seat, the valve in contact with the valve seat when the valve is in a closed position, and the valve is moved away from the valve seat when the valve is in an open position;
wherein the coil is energized to move the armature and the valve away from the valve seat against the force of the load spring and the return spring when the valve is in the closed position, and the indexing latch is engaged with the index mechanism and the valve is in contact with the valve seat, such that when the armature, the valve, and the indexing latch move far enough away from the valve seat, the index mechanism rotates about the armature and becomes engaged with the guide, maintaining the valve in the open position when the coil is then de-energized to move the armature, the valve, and index mechanism away from the guide, such that the index mechanism disengages from the guide, rotates about the armature, and reengages with the indexing latch, and when the coil is then again de-energized, the valve moves to the closed position.

17. The latching mechanism for a fuel tank isolation valve of claim 16, wherein the fuel tank isolation valve is in fluid communication with a fuel tank and a canister, and the valve is changed between the open position and the closed position to control vacuum pressure in the fuel tank, and the flow of purge vapor from the fuel tank to the canister.

18. The latching mechanism for a fuel tank isolation valve of claim 16, the spring cup further comprising:
an inner cylindrical portion located next to the index mechanism;

a central flange integrally formed with the inner cylindrical portion;

an outer cylindrical portion integrally formed with the central flange, the outer cylindrical portion circumscribed by part of the load spring; and an outer flange integrally formed with the outer cylindrical portion, the load spring in contact with the outer flange;

wherein the load spring is disposed between the outer flange and the inner stator insert, and biases the spring cup and the index mechanism away from the inner stator insert, such that the valve is biased towards a closed position when the index mechanism is engaged with the indexing latch.

19. The latching mechanism for a fuel tank isolation valve of claim 16, further comprising:

a first plurality of teeth formed as part of the indexing latch;

a second plurality of teeth formed as part of the guide;

a plurality of slots formed as part of the guide; and a plurality of indexing teeth formed as part of the index mechanism;

wherein each of the plurality of indexing teeth are disposed in a corresponding one of the plurality of slots and engaged with the first plurality of teeth when the valve is in the closed position, and the plurality of indexing teeth are removed from the plurality of slots and engaged with the second plurality of teeth when the valve is in the open position.

20. The latching mechanism for a fuel tank isolation valve of claim 19, wherein the first plurality of teeth are positioned relative to the second plurality of teeth such that when the valve is in the closed position, and the coil is energized, moving the indexing latch and the index mechanism away from the valve seat such that the first plurality of teeth move the plurality of indexing teeth out of the plurality of slots, causing the index mechanism to rotate relative to the armature, and engage the second plurality of teeth when the coil is de-energized allowing the first plurality of teeth to disengage from the plurality of indexing teeth, and when the plurality of indexing teeth are engaged with the second plurality of teeth and the valve is in the open position, the coil is again energized to reengage the first plurality of teeth with the indexing teeth such that the plurality of indexing teeth are disengaged from the second plurality of teeth, causing the index mechanism to rotate relative to the armature, and each of the plurality of indexing teeth to move back into a corresponding one of the plurality of slots, allowing the armature and the valve to move toward and contact the valve seat, placing the valve back in the closed position.

21. The latching mechanism for a fuel tank isolation valve of claim 19, further comprising:

a plurality of indexing splines formed as part of the indexing latch;

wherein each one of the plurality of indexing splines slides in one of the plurality of slots as the indexing latch moves relative to the guide.

* * * * *